United States Patent [19]

Brunelle

[11] Patent Number: 5,514,813

[45] Date of Patent: *May 7, 1996

[54] PREPARATION OF MACROCYCLIC POLYETHERIMIDE OLIGOMERS FROM SUBSTITUTED BISPHTHALIMIDES

[75] Inventor: Daniel J. Brunelle, Burnt Hills, N.Y.

[73] Assignee: General Electric Company, Schenectady, N.Y.

[*] Notice: The portion of this patent shall not extend beyond the expiration date of Pat. No. 5,229,482.

[21] Appl. No.: 341,815

[22] Filed: Nov. 18, 1994

Related U.S. Application Data

[63] Continuation-in-part of Ser. No. 92,104, Jul. 16, 1993, abandoned.

[51] Int. Cl.$^6$ .................................................. C07D 209/48
[52] U.S. Cl. ........................................................ 548/462
[58] Field of Search ............................................. 548/462

[56] References Cited

U.S. PATENT DOCUMENTS 5,116,975  5/1992  Brunelle ................................. 544/86
5,229,482  7/1993  Brunelle ................................. 548/125

Primary Examiner—Jacqueline Haley
Attorney, Agent, or Firm—William H. Pittman

[57] ABSTRACT

Macrocyclic polyetherimide oligomer compositions are prepared by the reaction of an alkali metal salt of a dihydroxyaromatic compound, preferably of bisphenol A, with a substituted bis-phthalimide, typically a chloro-, fluoro- or nitro-substituted o- or m-phenylene bis-phthalimide. The reaction takes place in a substantially non-polar solvent such as o-dichlorobenzene and at temperatures in the range of about 180°–225° C. in the presence of a phase transfer catalyst which is stable at such temperatures, such as a guanidinium salt. The concentration of phase transfer catalyst is such as to maintain the alkali metal salt at high dilution in the solvent, and the substituted bis-phthalimide is preferably also maintained at high dilution by portionwise addition.

15 Claims, No Drawings

PREPARATION OF MACROCYCLIC POLYETHERIMIDE OLIGOMERS FROM SUBSTITUTED BISPHTHALIMIDES

CROSS-REFERENCE TO RELATED APPLICATION

This application is a continuation-in-part of copending application Ser. No. 08/092,104 filed Jul. 16, 1993, now abandoned.

BACKGROUND OF THE INVENTION

This invention relates to the preparation of macrocyclic oligomer compositions, and more particularly to the preparation of macrocyclic polyetherimide oligomers.

U.S. Pat. No. 5,357,029 discloses a class of macrocyclic polyimide oligomer compositions not containing spiro(bis)indane moieties. Said compositions may be converted to linear polyimides. By reason of the low viscosities of the oligomer compositions in comparison to the linear polymers, said compositions are capable of employment in areas from which polyimides have previously been barred.

According to said application, the macrocyclic polyimide oligomers are prepared by the reaction of equimolar amounts of at least one tetracarboxylic acid or its dianhydride and at least one diamine. Said reaction requires pseudo-high dilution conditions; i.e., maintenance of the reagents at high dilution. Since the condensation reaction between the acid and the diamine is slow, the rate of reagent introduction must also be slow and the reaction may take several hours to go to completion.

In recent years, there has been an increase in interest in the preparation of polyetherimides, a subgenus of polyimides, by the reaction of substituted bis-phthalimides with salts of dihydroxyaromatic compounds. Reference is made, for example, to U.S. Pat. No. 5,229,482. This reaction normally takes place in the presence of phase transfer catalysts and at relatively high temperatures. Thus, the phase transfer catalysts employed must be stable at high temperatures. Various classes of substituted guanidinium salts having the required stability are disclosed in said U.S. Pat. No. 5,229,482 and in various other patents, particularly U.S. Pat. Nos. 5,081,298, 5,082,968, 5,116,975 and 5,132,423, the disclosures of all of which are incorporated by reference herein.

SUMMARY OF THE INVENTION

It has now been discovered that macrocyclic polyetherimide oligomer compositions can also be prepared by the reaction of substituted bis-phthalimides with salts of dihydroxyaromatic compounds, under phase transfer conditions. Like the earlier methods for preparation of such compositions, this reaction requires pseudo-high dilution conditions. Such conditions are easy to achieve by portionwise addition of the bis-phthalimide and maintenance of specific proportions of phase transfer catalyst.

The invention is a method for preparing a composition comprising macrocyclic polyetherimide oligomers which comprises contacting, in a substantially non-polar solvent and at a temperature in the range of about 180°–225° C., at least one alkali metal salt of a dihydroxy-substituted aromatic hydrocarbon with at least one substituted bis-phthalimide of the formula

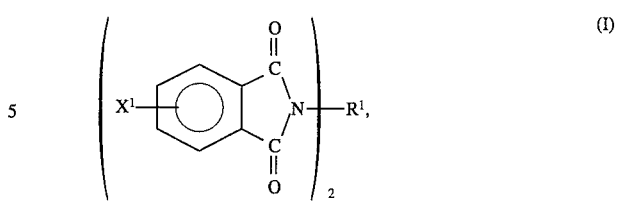

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

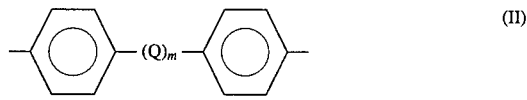

in which Q is —$C_2H_4$—, —O—,

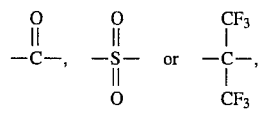

$X^1$ is fluoro, chloro, bromo or nitro and m is 0 or 1, in the presence of a phase transfer catalyst which is substantially stable at the temperatures employed; the molar ratio of said alkali metal salt to said substituted bis-phthalimide being in the range of about 1.05–1.1:1 and the proportion of said phase transfer catalyst being in the range of about 2–8 mole percent based on said alkali metal salt; and recovering said macrocyclic polyimide oligomers from said composition.

DETAILED DESCRIPTION; PREFERRED EMBODIMENTS

The alkali metal salts of dihydroxy-substituted aromatic hydrocarbons which are employed in the present invention are typically sodium and potassium salts. Sodium salts are frequently preferred by reason of their availability and relatively low cost.

Suitable dihydroxy-substituted aromatic hydrocarbons include those having the formula

wherein $A^1$ is a divalent aromatic hydrocarbon radical. Suitable $A^1$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula

wherein each of $A^2$ and $A^3$ is a monocyclic divalent aromatic hydrocarbon radical and Y is a bridging hydrocarbon radical in which one or two atoms separate $A^2$ from $A^3$. The free valence bonds in formula III are usually in the meta or para positions of $A^2$ and $A^3$ in relation to Y. Compounds in which $A^1$ has formula IV are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula IV, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o-or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula IV is the 2,2-bis(4-phenylene)propane radical, which is derived from bisphenol A and in which Y is isopropylidene and $A^2$ and $A^3$ are each p-phenylene.

In the substituted bis-phthalimides of formula I, $R^1$ is most often m-phenylene or p-phenylene. Also present are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are 1,3- and 1,4-bis[N-(4-fluorophthalimido)]benzene and the corresponding chloro compounds.

A third material employed according to the present invention is a solvent of low polarity, usually substantially lower than that of the dipolar aprotic solvents previously employed for the preparation of aromatic polyether polymers. Said solvent preferably has a boiling point above about 175° C., in order to facilitate the reaction which requires temperatures in the range of about 180°–225° C. Suitable solvents of this type include o-dichlorobenzene, dichlorotoluene, 1,2,4-trichlorobenzene and diphenyl sulfone. Solvents of similar polarity but lower boiling points, such as chlorobenzene, may be employed at superatmospheric pressures.

An essential feature of the invention is the presence of a phase transfer catalyst which is substantially stable at temperatures in the range of about 180°–225° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and the aforementioned guanidinium salts.

The preferred phase transfer catalysts, by reason of their exceptional stability at high temperatures and their effectiveness to produce macrocyclic polyetherimide oligomer compositions in high yield, are the hexaalkylguanidinium salts and a,ω-bis(pentaalkylguanidinium)alkane salts and their heterocyclic analogs. For the sake of brevity, both types of salts are hereinafter sometimes designated "guanidinium salt".

Suitable guanidinium salts are represented by the formula

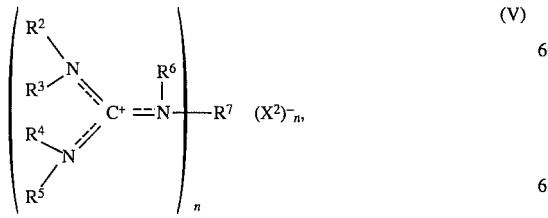

wherein:

each of $R^2$, $R^3$, $R^4$, $R^5$ and $R^6$ is a primary alkyl radical and $R^7$ is a primary alkyl or bis(primary alkylene) radical, or at least one of the $R^2$–$R^3$, $R^4$–$R^5$ and $R^6$–$R^7$ combinations with the connecting nitrogen atom forms a heterocyclic radical;

$X^2$ is an anion; and n is 1 or 2.

The alkyl radicals suitable as $R^{2-6}$ include primary alkyl radicals, generally containing about 1–12 carbon atoms. $R^7$ is usually an alkyl radical of the same structure or a $C_{2-12}$ alkylene radical in which the terminal carbons are primary; most preferably, it is $C_{2-6}$ alkyl or $C_{4-8}$ straight chain alkylene. Alternatively, any combination of $R^{2-7}$ and the corresponding nitrogen atom(s) may form a heterocyclic radical such as piperidino, pyrrolo or morpholino.

The $X^2$ value may be any anion and is preferably an anion of a strong acid; examples are chloride, bromide and methanesulfonate. Chloride and bromide ions are usually preferred. The value of n will be 1 or 2 depending on whether $R^7$ is alkyl or alkylene.

As indicated by the dotted bonds in formula V, the positive charge in the guanidinium salt is delocalized over one carbon and three nitrogen atoms. This is believed to contribute to the salts' stability under the relatively high temperature conditions encountered according to the invention. Thus, decomposition of the guanidinium salt does not occur or occurs only to a very minor extent. The results include suppression of by-product formation and potential for continued use via recycle.

The method of this invention is similar to other methods for the preparation of macrocyclic oligomer compositions in that at least one reagent must be maintained under pseudo-high dilution conditions as previously described. Since the alkali metal salts employed according to the invention are essentially insoluble in the solvents employed, the proportion of such compounds available for reaction with the substituted bis-phthalimide is controlled by the proportion of phase transfer catalyst in the reaction mixture. Two moles of phase transfer catalyst are required to solubilize one mole of the alkali metal salt, and consequently the effective molar concentration of said alkali metal salt will be half the level of the phase transfer catalyst divided by the volume of solvent.

Thus, the alkali metal salt is effectively in high dilution since the actual molar proportion thereof present with respect to solvent is typically less than about 0.01 M. It is also preferred to maintain the substituted bis-phthalimide at pseudo-high dilution by introducing it gradually (e.g., portionwise) into the reaction mixture, either as a solid or as a slurry in the solvent employed since its solubility therein is quite low.

The molar ratio of alkali metal salt to substituted bis-phthalimide is in the range of 1.05–1.1:1. While it might be expected that equimolar amounts should be employed, it is generally found that the reaction does not then go to completion and there are present in the product substituted phthalimide-terminated linear oligomers. The presence of a slight excess of substituted bis-phthalimide is not detrimental to the formation of macrocyclic oligomers, since the rate-limiting step is the phase transfer of the organic anion of the alkali metal salt into the solvent.

The reaction is preferably conducted in an inert atmosphere such as argon, helium or nitrogen. Reaction temperatures in the range of about 180°–225° and preferably about 200°–225° C. are employed. However, if the macrocyclic oligomer composition is maintained at such temperatures after formation it tends to be converted to linear polyetherimide, particularly if alkali metal salt is still present. It is therefore highly preferred to quench the reaction immediately after its completion as shown by analysis, typically about 5–10 minutes after all the substituted bis-phthalimide has been added. Quenching is typically by cooling and/or adding an acidic material such as acetic acid.

Following completion of the reaction including the quenching step if employed, the macrocyclic polyimide oligomers are recovered from the composition. Recovery may be in solution or, preferably, in solid form for conversion to linear polyimides. Separation of the solid oligomers from solution is typically achieved by combination with a non-solvent such as acetone.

The products of the method of this invention have been shown by analysis to be macrocyclic oligomers, rather than the linear polyimides obtained by the method of the aforementioned U.S. Pat. No. 5,229,482. In particular, their carbon-13 nuclear magnetic resonance spectra are substantially free from peaks attributable to end groups, particularly chlorophthalimide and phenol end groups.

The invention is illustrated by the following examples.

EXAMPLE 1

A dry 100-ml. round-bottomed flask was placed in a dry box and 749 mg. (2.75 mmol.) of dry bisphenol A disodium salt was introduced. The flask was capped, removed and maintained in an argon atmosphere as 43 mg. (0.125 mmol.) of tris(piperidino)guanidinium bromide and 20 ml. of dry, distilled o-dichlorobenzene were added. The flask was fitted with an air condenser and the o-dichlorobenzene was brought to reflux by heating in an oil bath at 210° C.

A slurry was prepared by stirring 1.093 grams (2.5 mmol.) of m-phenylene-bis(4-chlorophthalimide) in 10 ml. of dry o-dichlorobenzene at about 75° C. The slurry was added in 10 portions over 30 minutes to the refluxing reaction mixture. After complete addition, the mixture was stirred under reflux for 5 minutes and a sample was taken for reverse high pressure liquid chromatographic analysis. Further samples were taken after refluxing periods of 45 minutes and 1 hour. After 1 hour, the mixture was cooled to about 100° C. and quenched with acetic acid.

The sample taken at 5 minutes was found to contain cyclic oligomers having degrees of polymerization from 2 up to about 10, as well as chloro-terminated linear oligomers. At 45 minutes, the yield of macrocyclic oligomers was 65% and the principal by-product was linear polyetherimide. After 1 hour, the proportion of macrocyclic oligomers had diminished to about 55%.

The reaction mixture was diluted with chloroform and washed with water and 1 M aqueous sodium hydroxide solution, and the macrocyclic polyetherimide oligomers were isolated by pouring into an excess of acetone followed by filtration. The product was found by proton and carbon-13 nuclear magnetic resonance spectroscopy to contain aryletherimide groups but no chlorophthalimide or phenol groups.

EXAMPLES 2–7

The procedure of Example 1 was repeated, with variations in reaction temperature, substituted phthalimide employed, mode of introduction of reagents, molar concentration of bisphenol A disodium salt with respect to solvent and time of quenching (45 minutes after introducing the reagents in Examples 2–3, 15 minutes after completion of bis-phthalimide introduction in Example 4, 5 minutes after completion of bis-phthalimide introduction in Examples 5–7). The relevant parameters and results are given in the following table.

| | | Subst. phthalimide | | Reaction | Macrocyclic oligomers | |
|---|---|---|---|---|---|---|
| Ex. | Identity | Conc., M | Addn. mode | temp., °C. | Yield, % | Min. DP |
| 2 | 4-Chloro | 0.05 | All initially | 200 | 45 | 2 |
| 3 | " | 0.10 | 10 portions, every 3 min. | 180 | 30 | 2 |
| 4 | " | 0.10 | 10 portions, every 3 min. | 210 | 65 | 2 |
| 5 | 4-Fluoro | 0.20 | 10 portions, every 3 min. | 210 | 70 | 2 |
| 6 | " | 0.10 | 10 portions, every 3 min. | 210 | 85 | 2 |
| 7 | 3-Chloro | 0.10 | 20 portions, every 2 min. | 210 | 94 | 1 |

It is apparent that the steric situation with the bis(3-chlorophthalimide) is somewhat different than with the 4-isomer, permitting the formation of a macrocyclic oligomer with a degree of polymerization of 1. Even when all reagents are initially present, a yield of 45% macrocyclic oligomers was noted. Yield was substantially decreased at a reaction temperature of 180° C., outside the preferred temperature range.

What is claimed is:

1. A method for preparing a composition comprising macrocyclic polyetherimide oligomers which comprises gradually introducing, at a temperature in the range of about 180°–225° C., at least one substituted bis-phthalimide of the formula

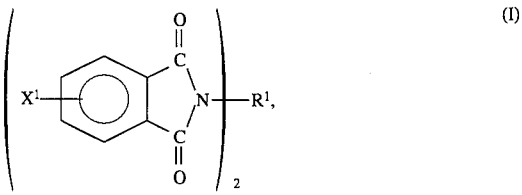

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

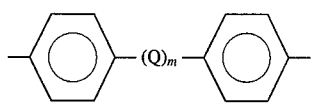

in which Q is —$C_2H_4$—, —O—,

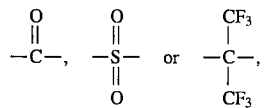

$X^1$ is fluoro, chloro, bromo or nitro and m is 0 or 1, into a mixture of a solvent of low polarity and at least one alkali metal salt of a dihydroxy-substituted aromatic hydrocarbon in the presence of a phase transfer catalyst which is substantially stable at the temperatures employed; the molar ratio of said alkali metal salt to said substituted bis-phthalimide being in the range of about 1.05–1.1:1 and the proportion of said phase transfer catalyst being in the range of about 2–8 mole percent based on said alkali metal salt; and recovering said macrocyclic polyimide oligomers from said composition.

2. A method according to claim 1 wherein the reaction mixture comprising the alkali metal salt, substituted bis-phthalimide and reaction products thereof is quenched immediately after completion of the reaction between said substituted bis-phthalimide and alkali metal salt.

3. A method according to claim 2 wherein the phase transfer catalyst is a hexaalkylguanidinium salt, an a,ω-bis(pentaalkylguanidinium)alkane salt or a heterocyclic analog thereof.

4. A method according to claim 3 wherein the solvent is o-dichlorobenzene.

5. A method according to claim 3 wherein the temperature is in the range of about 200°–225° C.

6. A method according to claim 3 wherein the reaction is conducted in an inert atmosphere.

7. A method according to claim 3 wherein the alkali metal salt is a bisphenol A salt.

8. A method according to claim 7 wherein the bisphenol A salt is the disodium salt.

9. A method according to claim 3 wherein $R^1$ is m-phenylene or p-phenylene.

10. A method according to claim 9 wherein $R^1$ is m-phenylene.

11. A method according to claim 9 wherein $R^1$ is p-phenylene.

12. A method according to claim 3 wherein $X^1$ is fluoro, chloro or nitro.

13. A method according to claim 12 wherein $X^1$ is fluoro.

14. A method according to claim 12 wherein $X^1$ is chloro.

15. A method according to claim 12 wherein $X^1$ is nitro.

* * * * *